May 10, 1927. 1,627,795
R. A. MANNING
MILK FILTER
Filed June 19, 1926    2 Sheets-Sheet 2
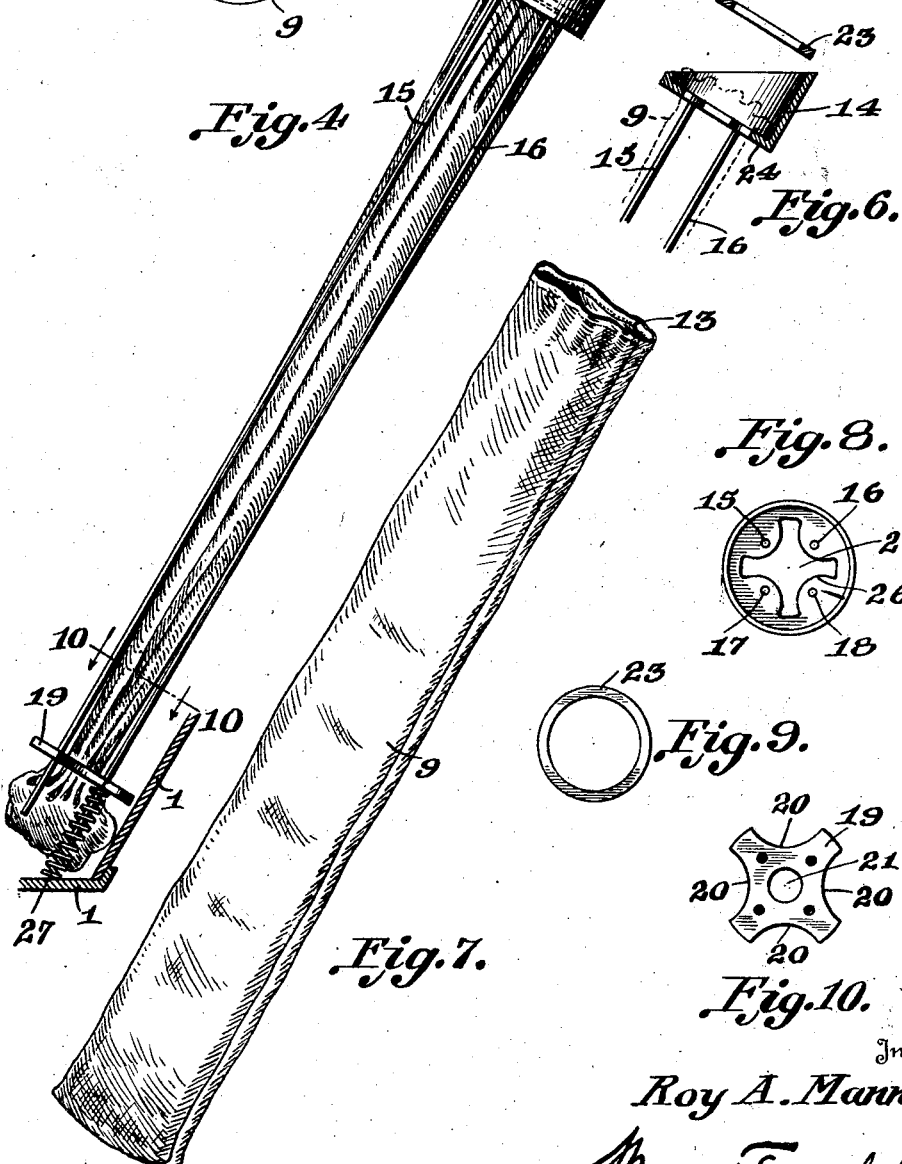

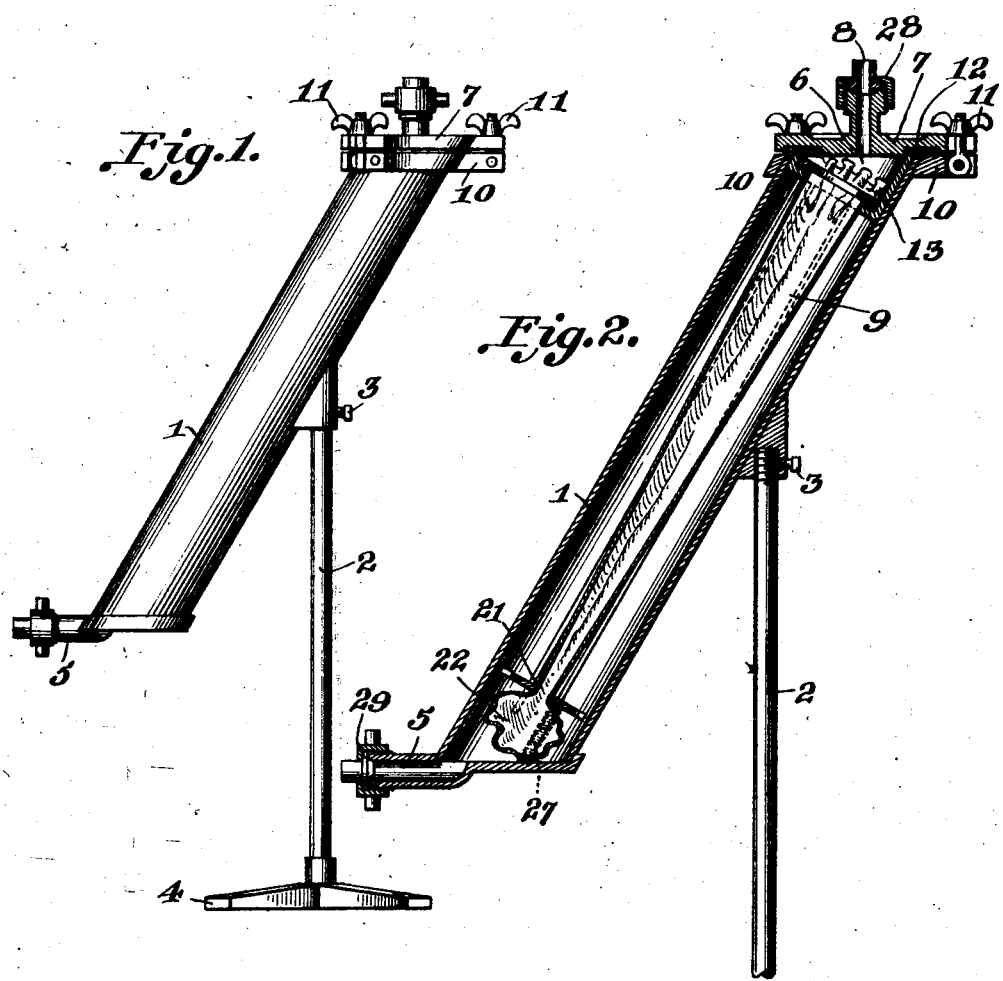

Patented May 10, 1927.

1,627,795

UNITED STATES PATENT OFFICE.

ROY A. MANNING, OF RUTLAND, VERMONT, ASSIGNOR TO THE MANNING MANUFACTURING COMPANY, OF RUTLAND, VERMONT.

MILK FILTER.

Application filed June 19, 1926. Serial No. 117,102.

This invention relates to improvements in milk filters, particularly in a device for filtration which is accomplished by the milk running under pressure through a special filtering sack of close weave of any suitable material.

An object of this invention is to provide a milk filter in which a suitable sediment trap is preferably located or arranged at the bottom end of the filtering sack, wherein the sediment reaching this trap cannot back up into the container of the device and mix with the milk going into the container and sack to be filtered or cleaned.

A further object of this invention is to provide a milk filter arranged at a proper angle to its support so that the incoming milk at the top will run through the filtering sack within the container and down along the inside wall thereof and hence out of the bottom outlet in the container.

A further object of this invention is to provide a milk filter in which the milk will not travel through previously filtered sediment, thereby being a great improvement over filters in common use.

Another object is to provide a milk filter which does not affect the cream line in any appreciable manner, merely removing the dirt, sediment or other foreign matter.

Other objects of this invention will appear from the following detailed description of the device and from the disclosure in the two sheets of drawings which are herewith made a part of this application.

In the drawings,

Fig. 1 illustrates a side elevational view of the milk filter in assembled relationship, particularly disclosing the support and the angular arrangement of the container support.

Fig. 2 represents a vertical sectional view of the milk filter disclosing the arrangement of the filtering cloth in relationship to the container and the support thereof.

Fig. 3 illustrates a top plan view of Fig. 1.

Fig. 4 represents a side view of the filtering sack removed from the container but held in operating position within the detachable supporting frame.

Fig. 5 illustrates a top plan view of Fig. 4 in the direction noted by the arrow "a."

Fig. 6 discloses a section view of the top portion of the inlet to the filter sack as disclosed in Fig. 4 but with the clamping ring for holding the milk sack shown removed from the inlet portion.

Fig. 7 illustrates a side elevational view of the milk sack removed from the container and holding frame.

Fig. 8 represents a plan view of the top guiding piece for holding the supporting frame of the milk sack.

Fig. 9 illustrates a plan view of the clamping ring for clamping the opening end of the milk sack into position in the supporting frame work.

Fig. 10 illustrates a plan view of the lower guiding plate for holding the supporting frame work of the milk sack, taken along line 10—10 of Fig. 4.

Numeral 1 designates a hollow container made of suitable material and held at a proper angle to the supporting rod 2 by means of a set screw 3 or otherwise, the supporting rod 2 having a suitable base piece 4. The container 1 is provided at its lower end with an outlet 5, while the upper open end of the container 6 is provided with a cap portion 7 having an opening 8 therein through which the milk is adapted to enter under pressure into the milk sack 9 within the container 1. The cap portion 7 may be made of any suitable material, but preferably of a strong and rugged construction to correspond with the construction of the container itself. Suitable wing nuts 11 are pivotally connected with the flange portion 10 at the upper end of the container and are adapted to be swung so as to interlock the cap portion 7 with the container, while gaskets 12 are provided in the cap portion in such a manner as to form an efficient sealing means between the container and the cap when in interlocked relationship.

The milk sack 9 may be made of any suitable filtering cloth of close weave, of a general shape to conform with that disclosed in Fig. 7. One end of the sack 9 is closed, while the other end is open as at 13. The filtering sack 9 is adapted to be held in operative position firmly within the container by means of a frame work consisting of a receiving upper head piece 14 of a proper shape to conform with the angularity of the container to the supporting rod. Attached to the upper head piece 14 of the framework are preferably a plurality of rods 15, 16, 17 and 18, extending approximately a distance equal to the length of the container 1, the rods at their free or lower ends being adapted to extend through a guide plate 19 a suitable distance. The rods are fastened to the plate 19 so that they will not work loose. The guide plate 19 is preferably formed with notches 20 along its periphery, thereby allowing free passage of the filtered milk to the outlet 5 in the container. A central opening 21 in the plate 19 is arranged so as to allow a lower portion of the filter sack 9 to pass therethrough and form a sediment chamber or trap 22, thereby providing a simple sediment trap at the lower end of the filtering sack; the sediment reaching this trap cannot extend back up into the container through the opening 8, owing in part, to the constricted opening 21 in the plate 19. The filtering sack 9 is adapted to extend upwardly in the container and is held firmly at its open end in the portion 14 of the framework by means of a clamping ring 23. The receiving part of the frame 14 is provided with a base portion 24, in which is provided an opening 25 for receiving the open end of the filtering sack 9. The opening 25 is preferably formed having inwardly arched shaped projections 26 which are adapted to receive the upper overlapping edges of the filtering sack in such a manner as to form a suitable and efficient opening through which the milk is allowed to pass into the filtering sack, the overlapping edges of the open end of the sack being held firmly in place by the clamping ring 23. The upper ends of the framing rods or elements 15, 16, 17 and 18 may be firmly fastened to the portion 24 of the receiving element 14 by any suitable means.

In order to hold the framework and the filtering sack firmly within the container, resilient means such as tension springs 27 may be provided to cooperate with the elements of the frame construction as disclosed in Figs. 2 and 4. The resilient elements are preferably located below the plate 19 in such a manner as to provide sufficient tension qualities to hold the sack and frame work firmly within the container 1 when the cap portion has been brought into interlocked relationship to the container and the filtering device has been placed in condition for operation.

Suitable and adjustable nozzle portions 28 and 29 are fastened at the inlet and outlet openings 8 and 5 of the container.

In operation this invention provides an efficient milk filtering apparatus. It is simple and inexpensive in comparison to many other devices in common use. The filtration by means of this invention is accomplished by the milk being supplied to the filter under pressure through a special filtering sack of close weave, the sack having a sediment trap at the bottom thereof, whereby the sediment reaching this trap cannot back up into the container and mix with the milk coming in to the container through the opening 8 under pressure. Furthermore, the container in this invention is positioned at an angle to its support whereby the incoming milk at the top will run through the filtering sack and down the inside wall of the container hence out of the bottom outlet 5. This arrangement obviously provides a smooth flowing channel for the milk. One of the prime advantages of this invention is that the milk does not have to flow through previously filtered sediment, a disadvantage which is common to the filters in ordinary use.

The entire filtering device provided in this invention is extremely simple, no intermediate moving parts of any kind, nothing to get out of order and nothing to change except the filtering sack. The sacks 9 may be boiled out or otherwise and used over and over again, thereby reducing the cost of material. It takes but a minute or so to remove the cap and change the sack. The sealing means at the top of the container operates to efficiently seal the container and therefore the milk is neither exposed to the air and there is no waste or leakage. No extra pump pressure is required. The machine is simple to install in any hot milk line. The machine is strongly constructed. Every metal part which comes in contact with the milk is preferably tinned copper or bronze. The milk filter as described above will not affect the cream line in any way, it merely removes the dirt, sediment or other foreign material in a highly efficient manner.

What I claim is:

1. A milk filter comprising a container having an opening at top and bottom, a support arranged to carry the container at an angle thereto, a filtering sack within the container, means in the lower portion of the container for forming a sediment trap in the sack, a cap for the top opening of the container, an opening in the cap for admitting milk to the filtering sack, the opening at the bottom of the container being adapted for allowing filtered milk to flow from the container.

2. A milk filter comprising a container having an opening at top and bottom, a support arranged to carry the container at an angle thereto, a filtering sack within the container, means in the lower portion of the container for forming a sediment trap in the sack, a cap for the top opening of the container, an opening in the cap for admitting milk to the filtering sack, the opening at the bottom of the container being adapted for allowing filtered milk to flow from the container, the cap for the top of the container having suitable sealing means for interlocking with the container.

3. A milk filter comprising a container having an opening at top and bottom, a support arranged to carry the container at an angle thereto, a filtering sack within the container, a cap for the top opening of the container, an opening in the cap for admitting milk to the filtering sack, the opening at the bottom of the container being adapted for allowing filtered milk to flow from the container, the cap for the top of the container having suitable sealing means for interlocking with the container, a frame support for the filter sack within the container, the frame support having means for forming a sediment trap in the sack.

4. A milk filter comprising a container having an opening at top and bottom, a support arranged to carry the container at an angle thereto, a filtering sack within the container, means in the container for forming a sediment trap in the sack, a cap for the top opening of the container, an opening in the cap for admitting milk to the filtering sack, the opening at the bottom of the container being adapted for allowing filtered milk to flow from the container, whereby the incoming milk at the top runs through the filtering sack and down the inside wall of the container, thence out of the bottom opening in the container.

5. A milk filter comprising a container having an opening at the top and bottom thereof, a filtering sack having an open and closed end within the container, a supporting frame for the sack, having means for forming a sediment trap in the sack, the frame and sack being removably positioned within the container, suitable frame elements at the upper and lower ends for holding the sack in position.

6. A milk filter comprising a container having an opening at the top and bottom thereof, a filtering sack having an open and closed end within the container, a supporting frame for the sack, having means for forming a sediment trap in the sack, the frame and sack being removably positioned within the container, suitable frame elements at the upper and lower ends for holding the sack in position, the upper frame element being adapted to hold the open end of the sack for receiving the milk from the top opening of the container.

7. A milk filter comprising a container having an opening at the top and bottom thereof, a filtering sack having an open and closed end within the container, a supporting frame for the sack, the frame and sack being removably positioned within the container, suitable frame elements at the upper and lower ends for holding the sack in position, the upper frame element being adapted to hold the open end of the sack for receiving the milk from the top opening of the container, the lower element having an opening therein through which the closed end of the filter sack is extended a sufficient distance to form a sediment trap, whereby the sediment due to filtering on reaching this trap through the constricted opening of the lower element cannot back up into the container and mix with the unfiltered milk.

8. A milk filter comprising a container having an opening at the top and bottom thereof, a filtering sack having an open and closed end within the container, a supporting frame for the sack, having means for forming a sediment trap in the sack, the frame and sack being removably positioned within the container, suitable frame elements at the upper and lower ends for holding the sack in position, and resilient means for holding the frame firmly within the container.

9. A milk filter comprising a container having an opening at top and bottom, a filtering sack within the container, the opening at the bottom of the container being adapted for allowing the filtered milk to flow from the container, a frame support for the filtering sack within the container, the frame support having means for forming a sediment trap in the sack.

In testimony whereof I affix my signature.

ROY A. MANNING.